(12) United States Patent
Ohashi

(10) Patent No.: US 8,544,512 B2
(45) Date of Patent: Oct. 1, 2013

(54) PNEUMATIC TIRE WITH TREAD HAVING SIPE

(75) Inventor: Toshiyuki Ohashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1426 days.

(21) Appl. No.: 12/134,326

(22) Filed: Jun. 6, 2008

(65) Prior Publication Data

US 2009/0050248 A1 Feb. 26, 2009

(30) Foreign Application Priority Data

Aug. 24, 2007 (JP) .................................. 2007-218688

(51) Int. Cl.
  *B60C 11/12* (2006.01)
(52) U.S. Cl.
  USPC ............. 152/209.18; 152/209.21; 152/DIG. 3
(58) Field of Classification Search
  USPC ......................... 152/209.18, 209.21, DIG. 3
  See application file for complete search history.

(56) References Cited

U.S. PATENT DOCUMENTS

| 6,116,310 | A * | 9/2000 | Shinohara ................. 152/DIG. 3 |
| 2003/0101851 | A1* | 6/2003 | Domange et al. ............. 76/101.1 |

FOREIGN PATENT DOCUMENTS

| JP | 03-169723 | * | 7/1991 |
| JP | 2005-104194 | * | 4/2005 |
| JP | 2005-161967 |   | 6/2005 |
| JP | 2005-247105 |   | 9/2005 |
| JP | 2006-36102 |   | 2/2006 |
| JP | 2006-069440 |   | 3/2006 |
| JP | 2006-298057 | * | 11/2006 |
| JP | 2006298057 | A | 11/2006 |
| JP | 2007-008303 |   | 1/2007 |

OTHER PUBLICATIONS

Machine translation for Japan 2006-298057 (machine translation).*
Machine translation for Japan 2005-104194 (no date).*
Translation for Japan 03-169723 (no date).*
Office Action (Aug. 21, 2009) in counterpart Chinese Appln 200810210882.9 and English translation.
German Office Action for Application No. 10 2008 035 238, dated Aug. 11, 2010, 5 pages.
Office Action dated Jul. 13, 2009 in counterpart JP Application 2007-218688.
Decision on Rejection issued by the Chinese Patent Office dated Jan. 22, 2010 in counterpart CN Application 200810210882.9 (with English translation) 11 pages.

* cited by examiner

*Primary Examiner* — Steven D Maki
(74) *Attorney, Agent, or Firm* — Fish & Richardson P.C.

(57) ABSTRACT

A sipe formed in a block of a tread surface is provided with a first sipe portion having a first wide portion, a second sipe portion having a second wide portion in a different side from the first wide portion in a sipe width direction and positioned close to a sipe bottom portion side of the first sipe portion so as to become wider than the first sipe portion, and a third sipe portion having a third wide portion in the same side as the first wide portion in the sipe width direction and positioned close to a sipe bottom portion side of the second sipe portion so as to become wider than the second sipe portion.

5 Claims, 3 Drawing Sheets

PNEUMATIC TIRE WITH TREAD HAVING SIPE

BACKGROUND OF THE INVENTION

1. Field of the Invention

The present invention relates to a pneumatic tire in which a sipe is formed in a land portion of a tread surface, and is particularly useful as a studless tire.

2. Description of the Related Art

Conventionally, in the studless tire, a cut called as the sipe is formed in the land portion of a block, a rib or the like, and a traveling performance on an ice road surface having a low friction coefficient is increased by an edge effect and a drainage effect generated by the sipe. As the sipe mentioned above, there have been put to a practical use a linear sipe extending linearly along a longitudinal direction, a waveform sipe extending like a waveform and the like.

In this case, since a rubber is incompressible, a motion of the tread surface being in contact with the road surface becomes great in the case that a load is applied to the tire, so that an opening portion of the sipe tends to be closed. Particularly, since the tread surface tends to be moved due to its slip, the sipe is easily closed and the opening portion is narrowed, on the ice road surface having the low friction coefficient, there is a case that the edge effect and the drainage effect to be essentially achieved by the sipe are lowered.

Accordingly, a tire described in Japanese Unexamined Patent Publication No. 2007-8303 is structured such as to make a tread rubber be easily deflected in a depth direction by providing a plurality of wide portions in a sipe, and absorb a deformation by the wide portions so as to inhibit an opening portion from being narrowed. Further, a tire described in Japanese Unexamined Patent Publication No. 2005-247105 is structured such that an opening portion is not completely closed in a wide portion at a time when a sipe is closed, by providing the wide portion extending in a depth direction from a tread surface so as to terminate without reaching a bottom portion of the sipe.

On the other hand, if a wear makes progress and a height of a land portion is reduced, a rigidity of the land portion is improved and a collapse of the land portion becomes small, so that there is a tendency that the edge effect generated by the sipe is lowered. As a result, there is a case that a braking performance (an ice braking performance) or the like on an ice road surface is deteriorated in accordance with a progress of the wear. On the contrary, in the case that a sipe width is previously set larger, the land portion excessively collapses in an initial stage of the wear such as a state in which tires are new, and the edge effect is further lowered.

With respect to this problem, it becomes important to make the rigidity of the land portion proper in correspondence to a stage of progress of the wear so as to secure the collapse of the land portion. However, the sipe structures described in Japanese Unexamined Patent Publication Nos. 2007-8303 and 2005-247105 do not disclose a solving means thereof. Further, Japanese Unexamined Patent Publication No. 2006-36102 proposes a structure securing the collapse of the land portion after a medium stage of the wear by providing a wide portion reaching a bottom portion of the sipe from a position coming in a depth direction from the tread surface. However, it has been known that there is a possibility of further improving a performance.

SUMMARY OF THE INVENTION

The present invention is made by taking the actual condition mentioned above into consideration, and an object of the present invention is to provide a pneumatic tire which can secure an edge effect and a drainage effect by inhibiting an opening portion of a sipe from being narrowed as well as making a rigidity of a land portion proper in correspondence to a stage of progress of a wear and securing a collapse of the land portion.

The object can be achieved by the following present invention. That is, the present invention provides a pneumatic tire structured such that a sipe is formed in a land portion of a tread surface, wherein the sipe comprises:

a first sipe portion provided with a first wide portion;

a second sipe portion provided with a second wide portion in a different side from the first wide portion in a sipe width direction, and positioned in a sipe bottom portion side of the first sipe portion so as to be wider than the first sipe portion; and a third sipe portion provided with a third wide portion in the same side as the first wide portion in the sipe width direction, and positioned in a sipe bottom portion side of the second sipe portion so as to be wider than the second sipe portion.

In the pneumatic tire in accordance with the present invention, since the first sipe portion appears on the wheel tread in the process of the progress of the wear, and the second sipe portion and the third sipe portion appear subsequently, the sipe width becomes greater in accordance that the wear makes progress, and the land portion is lowered in its rigidity and tends to be deflected. As a result, it is possible to make the rigidity of the land portion proper in correspondence to the progressing state of the wear, it is possible to secure the collapse of the land portion, and it is possible to well achieve the ice braking performance or the like from an initial stage over a medium stage and an end stage of the wear.

Further, since the deformation generated by a load can be absorbed by the wide portion at a time when the load is applied to the tire, it is possible to inhibit the opening portion of the sipe from being narrowed so as to secure the edge effect and the drainage effect. In the present invention, since the second wide portion is provided in the different side from the first wide portion and the third wide portion, it is possible to absorb the deformation in a well-balanced manner in both sides in the sipe width direction. Further, since it is possible to suppress the displacement of the center of arrangement of the sipe, it is possible to uniformize the ground contact pressure so as to contribute to the improvement of the ice braking performance or the like. On the contrary, since the center of arrangement of the sipe is greatly deviated in the sipe width direction in the case that the second wide portion is provided in the same side as the first wide portion and the third wide portion, the ground contact pressure tends to be uneven.

In the structure mentioned above, it is preferable that the first wide portion has a bottom portion, and the second wide portion extends in a depth direction from the same depth position as the bottom portion of the first wide portion or a depth position closer to a tread surface than the bottom portion of the first wide portion. In this case, since the first wide portion has the bottom portion, it is possible to inhibit the rigidity of the land portion from being excessively lowered. Further, since the continuity of the first sipe portion and the second sipe portion is secured, it is possible to smoothly enlarge the sipe width in the process of the progress of the wear.

In the structure mentioned above, it is preferable that the second wide portion has a bottom portion, and the third wide portion extends in a depth direction from the same depth position as the bottom portion of the second wide portion or a depth position closer to a tread surface than the bottom portion of the second wide portion. In this case, since the second wide portion has the bottom portion, it is possible to inhibit the rigidity of the land portion from being excessively lowered. Further, since the continuity of the second sipe portion and the third sipe portion is secured, it is possible to smoothly enlarge the sipe width in the process of the progress of the wear.

In the structure mentioned above, it is preferable that the first wide portion extends in a depth direction from a depth position which is spaced from a tread surface. In accordance with the structure mentioned above, since the first wide portion does not appear on the wheel tread in the initial stage of the wear, it is possible to suppress the effect of improving the collapse of the wide portion in the stage that the height of the land portion is secured and the rigidity of the land portion is low, and it is possible to bring the first wide portion into sight at a time point when the wear makes progress thereafter. Accordingly, it is possible to accurately carry out the adjustment of the rigidity of the land portion in correspondence to the stages of progress of the wear.

In the structure mentioned above, it is preferable that the land portion is provided with a cap rubber layer exposed to a tread surface, and a base rubber layer arranged in an inner peripheral side of the cap rubber layer and having a higher rubber hardness than the cap rubber layer. In the case that the land portion is provided with the base rubber layer as mentioned above, the improvement of the rigidity of the land portion at a time when the height of the land portion is reduced by the wear is promoted, and the collapse of the land portion becomes significantly small. Accordingly, the present invention achieving the operation and effect mentioned above is particularly useful.

DETAILED DESCRIPTION OF THE PREFERRED EMBODIMENTS

Figure 1:
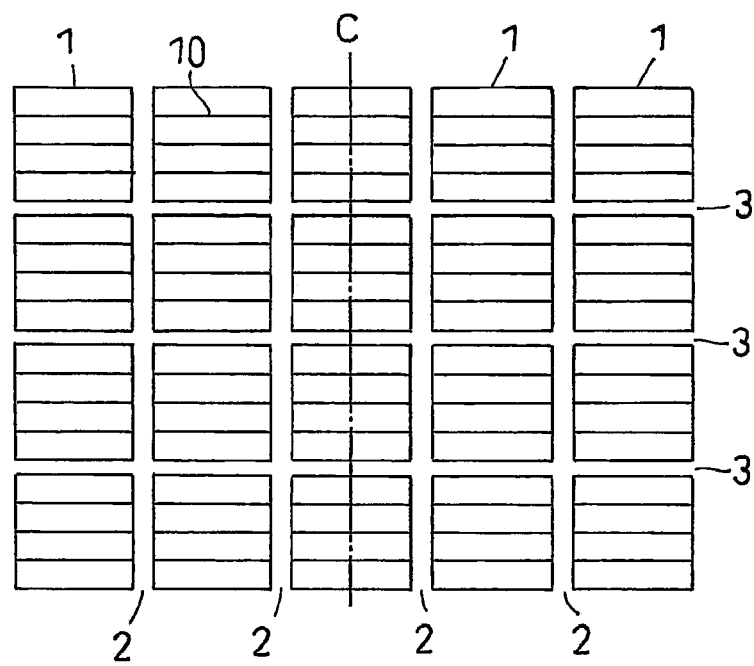
FIG. 1 is an expansion plan view showing one example of a tread surface of a pneumatic tire in accordance with the present invention.

An embodiment of the present invention will be explained with reference to the drawings. FIG. 1 is an expansion plan view showing one example of a tread surface of a pneumatic tire in accordance with the present invention. The pneumatic tire is provided with a tread pattern having a plurality of blocks 1 (one example of a land portion). The block 1 is comparted by a main groove 2 extending in a tire circumferential direction and a transverse groove 3 extending in a tire width direction, and five rows of blocks 1 are arranged symmetrically with respect to a tire equator line C.

A plurality of (three in the present embodiment) sipes 10 each having a linear opening portion is formed in each of the blocks 1 in parallel so as to be provided with a predetermined interval. The sipe 10 in accordance with the present embodiment is constituted by a both-side open sipe in which both ends are open in a sidewall of the block 1, however, the present invention is not limited to this, but one end or both ends may terminate at an inner portion of the block 1. In this case, in the light of making the block 1 be easily collapsed particularly after the medium stage of the wear, it is preferable to employ a one-side open sipe in which one end is open in the side wall of the block 1, and it is more preferable to employ a both-side open sipe.

Figure 2:
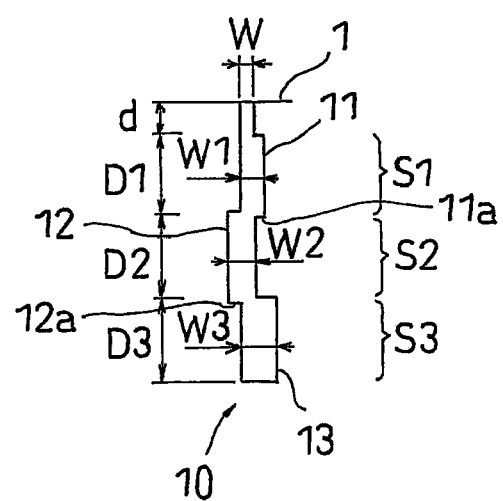
FIG. 2 is a side elevational view of a main portion of a block.
Figure 3:
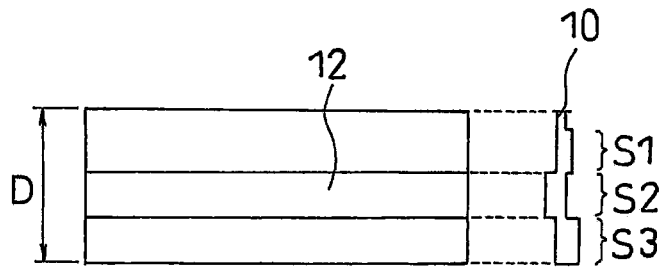
FIGS. 3(a) and 3(b) are views showing an inner wall surface of a sipe.
Figure 3:
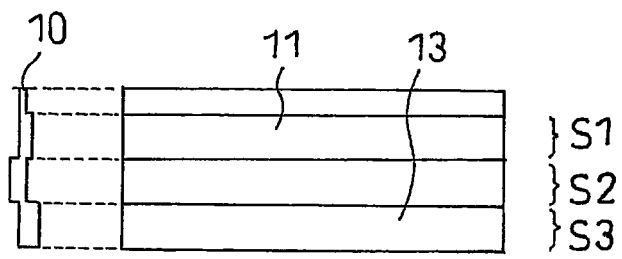

FIG. 2 is a side elevational view of a main portion of the block 1, a vertical direction comes to a depth direction of the sipe 10, and a lateral direction comes to a sipe width direction. FIGS. 3(a) and 3(b) are views showing an inner wall surface of the sipe 10, in which FIG. 3(a) shows an inner wall surface in a left side of FIG. 2, and FIG. 3(b) shows an inner wall surface in a right side of FIG. 2. As shown in FIGS. 2 and 3, the sipe 10 is provided with a first sipe portion S1 having a first wide portion 11, a second sipe portion S2 having a second wide portion 12, and a third sipe portion S3 having a third wide portion 13.

The first wide portion 11 is widened to the right side in FIG. 2, and the second wide portion 12 is widened to the left side in FIG. 2 and is provided in a different side from the first wide portion 11 in the sipe width direction. Further, the third wide portion 13 is widened to the right side in FIG. 2 and is provided in the same side as the first wide portion 11 in the sipe width direction. In other words, the first wide portion 11, the second wide portion 12 and the third wide portion 13 are provided alternately while sandwiching a sipe reference surface mentioned below therebetween along a depth direction, the second wide portion 12 is provided in a concave manner in an inner wall surface in FIG. 3(a), and the first wide portion 11 and the third wide portion 13 are provided in a concave manner in an inner wall surface in FIG. 3(b).

The first sipe portion S1, the second sipe portion S2 and the third sipe portion S3 are continuously provided in a depth direction of the sipe 10, the second sipe portion S2 is positioned in a sipe bottom portion side of the first sipe portion S1, and the third sipe portion S3 is positioned in a sipe bottom portion side of the second sipe portion S2. In the present embodiment, the sipe 10 is open at a sipe width W on the tread surface, and the first wide portion 11 extends in a depth direction from a depth position which spaced at an interval d from the tread surface. The third sipe portion S3 reaches the sipe bottom portion.

On the assumption that a sipe reference line is set to a line passing through a center in the width direction of the sipe 10 on the tread surface, and a sipe reference surface is set to a surface extending in the depth direction from the sipe reference line, a protruding height based on the sipe reference surface is larger in the order of the third wide portion 13, the second wide portion 12 and the first wide portion 11. Accordingly, the second sipe portion S2 is wider than the first sipe portion S1, and the third sipe portion S3 is wider than the second sipe portion S2. The sipe widths W1 to W3 in the respective sipe portions satisfy a relation W1<W2<W3.

In this case, in the light of securing the continuity of the first sipe portion S1 and the second sipe portion S2, it is preferable that the second wide portion 12 extends in the depth direction from the same depth position as the bottom portion 11a of the first wide portion 11 or a depth position which is closer to the tread surface side than the bottom portion 11a of the first wide portion 11. Further, in the light of securing the continuity of the second sipe portion S2 and the third sipe portion S3, it is preferable that the third wide portion 13 extends in the depth direction from the same depth position as the bottom portion 12a of the second wide portion 12 or a depth position which is closer to the tread surface side than the bottom portion 12*a* of the second wide portion 12.

Figure 4:
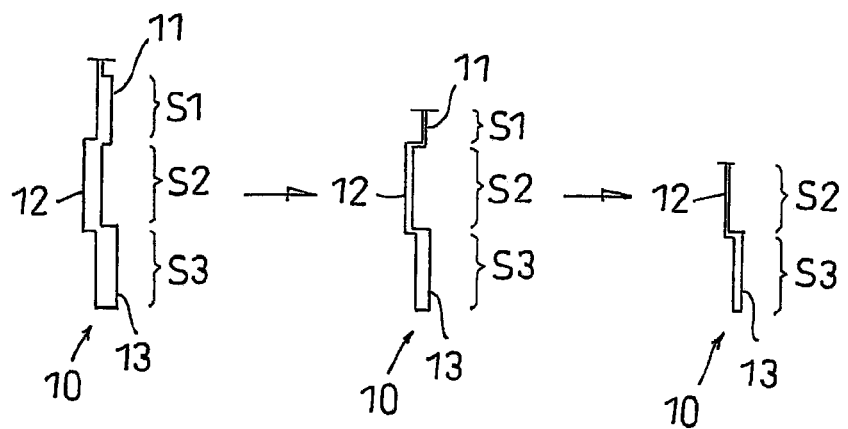
FIGS. 4(a) to 4(c) are side elevational views of a main portion of the block at a time of braking.
Figure 5:
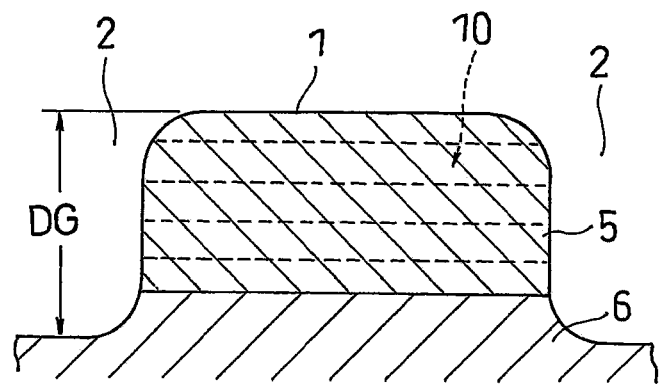
FIG. 5 is a vertical cross sectional view of the block.

FIGS. 4(*a*), 4(*b*) and 4(*c*) are side elevational views of a main portion of the block 1 at a time of braking, in which FIG. 4(*a*) shows a state in which tires are new, FIG. 4(*b*) shows a state in which 25% of the sipe depth wears, and FIG. 4(*c*) shows a state in which 45% of the sipe depth wears. First, since the first wide portion 11 does not appear on the wheel tread at the state in which tires are new, a gap of the sipe width W is closed at a time of braking, whereby the inner wall surfaces of the sipe are brought into contact with each other. In an initial stage of the wear such as the state in which tires are new, since the height of the block 1 is secured and the rigidity is low, the block 1 is easily deflected and tends to be collapsed, and the edge effect generated by the sipe 10 is suitably achieved.

Next, as shown in FIG. 4(*b*), the wear makes progress and the first sipe portion S1 appears on the wheel tread, the sipe 10 is deformed in such a degree that the gap of the sipe width W1 is closed, at a time of braking, and the rigidity of the block 1 is lowered and tends to be deflected, in spite that the height of the block 1 is reduced. As a result, it is possible to make the block 1 collapse at a time of braking, and it is possible to suitably achieve the edge effect. If the wear makes progress further, the second sipe portion S2 appears on the wheel tread as shown in FIG. 4(*c*), and the third sipe portion S3 appears on the wheel tread subsequently. Accordingly, in spite that the height of the block 1 is reduced, the rigidity of the block 1 is lowered as mentioned above so as to tend to be deflected, and it is possible to secure the collapse of the block 1 so as to suitably achieve the edge effect.

As mentioned above, in accordance with the sipe structure of the present invention, it is possible to make the rigidity of the block 1 proper in correspondence to the stages of progress of the wear so as to secure the collapse of the block 1, by subsequently making the first sipe portion S1, the second sipe portion S2 and the third sipe portion S3 appear on the wheel tread and enlarging the sipe width step by step, in the process that the wear makes progress. As a result, it is possible to generate the edge effect regardless of the stages of progress of the wear and it is possible to well achieve the ice braking performance or the like over the initial stage, the medium stage and the end stage of the wear.

Further, since it is possible to absorb the deformation generated by a load by the wide portions 11 to 13 at a time when the load is applied to the tire, it is possible to inhibit the opening portion of the sipe 10 from being narrowed so as to secure the edge effect and the drainage effect. Further, since the second wide portion 12 is provided in the different side from the first wide portion 11 and the third wide portion 13, it is possible to absorb the deformation in a well-balanced manner in both sides of the sipe width direction, and it is possible to suppress the displacement of the center of arrangement of the sipe 10. Therefore, it is possible to uniformize the ground contact pressure so as to contribute to an improvement of the ice braking performance or the like.

In the present invention, it is preferable that the sipe width W1 is 0.1 mm or more larger than the sipe width W, and it is further preferable that it is 0.2 mm or more larger than the sipe width W, for making the rigidity of the block 1 proper in correspondence to the stages of progress of the wear. In the same manner, it is preferable that the sipe width W2 is 0.1 mm or more larger than the sipe width W1, and it is further preferable that it is 0.2 mm or more larger than the sipe width W1. In the same manner, it is preferable that the sipe width W3 is 0.1 mm or more larger than the sipe width W2, and it is further preferable that it is 0.2 mm or more larger than the sipe width W2. Further, it is preferable that the sipe width W is between 0.2 and 0.6 mm for achieving the sufficient edge effect generated by the sipe 10.

As shown in FIGS. 2 and 3, on the assumption that the depth of the sipe 10 is set to D, the depth of the first wide portion 11 is set to D1, the depth of the second wide portion 12 is set to D2, and the depth of the third wide portion 13 is set to D3, it is preferable that D1/D is between 0.2 and 0.4, it is preferable that D2/D is between 0.2 and 0.4, and it is preferable that D3/D is between 0.2 and 0.4, for making the rigidity of the block 1 proper in correspondence to the stages of progress of the wear. Further, it is preferable that d/D is between 0.1 and 0.2. In this case, the depth of the wide portion corresponds to a distance in the depth direction from a position starting the widening to a bottom portion of the wide portion. It is preferable that the sipe depth D is between 30 and 80% of the depth of the main groove 2, for achieving the sufficient edge effect generated by the sipe 10.

The ground contact property is improved (the ground contact is uniformized and the ground contact area is increased) in accordance that the rubber constituting the block 1 is softer, so that the traveling performance on the ice road surface is improved. However, if a whole of the block 1 collapses, the edge effect tends to be lowered on the contrary. Accordingly, the block 1 in accordance with the present embodiment is provided with a cap rubber layer 5 exposed to the tread surface, and a base rubber layer 6 arranged in an inner peripheral side of the cap rubber layer 5 and having a higher rubber hardness than the cap rubber layer 5.

In accordance with the structure mentioned above, it is possible to apply such a strength as to deflect as an elastic body to the block 1 by arranging the base rubber layer 6 which is comparatively hard in the inner peripheral side, while improving the ground contact property by arranging the cap rubber layer 5 which is comparatively soft at a position coming into contact with the road surface, whereby it is possible to inhibit the whole of the block 1 from being collapsed. Then, since the base rubber layer 6 is provided, the block rigidity is further improved and the collapse becomes significantly small at a time when the height of the block 1 is reduced by the wear. Therefore, the present invention achieving the operations and effects mentioned above is particularly useful.

In the light of suitably generating the operations and effects mentioned above, it is preferable that a rubber hardness (a rubber hardness measured based on a durometer hardness test (type A) of JISK6253) of the cap rubber layer 5 is between 45 and 55 degrees, and it is preferable that the rubber hardness of the base rubber layer 6 is between 60 and 70 degrees. Further, it is preferable that the base rubber layer 6 is arranged at a depth 30% or less of a depth DG of the main groove 2 based on the groove bottom of the main groove 2.

In the present invention, it is preferable that the sipe density corresponding to the sipe length per unit area of the block 1 is 0.05 mm/mm$^2$ or more. If the sipe density is less than 0.05 mm/mm$^2$, there is a case that the effect to be essentially achieved by the sipe 10 can not be achieved suitably. Further, in the light of suitably securing the rigidity of the block 1, it is preferable that the sipe density does not exceed 0.2 mm/mm$^2$.

In the present embodiment, there is shown the example in which the sipe 10 is constituted by the linear sipe extending linearly in the longitudinal direction, however, the present invention is not limited to this, but may employ a waveform sipe extending in a waveform. In the waveform sipe, since the opening portion of the sipe is hard to be narrowed in comparison with the linear sipe, it is possible to effectively secure the edge effect and the drainage effect generated by the sipe in cooperation with the effect of inhibiting the opening portion from being narrowed by the wide portion mentioned above, and it is possible to inhibit the block 1 from being collapsed on a dry road surface.

The pneumatic tire in accordance with the present invention is the same as the normal pneumatic tire except that the sipe as mentioned above is provided in the land portion, and the present invention can employ any of the conventionally known material, shape, structure, manufacturing method and the like.

The present invention can be also applied to a so-called summer tire, however, since the present invention is excellent in the ice performance, the present invention is particularly useful as a studless tire (winter tire).

[Other Embodiments]

(1) The tread pattern provided in the pneumatic tire in accordance with the present invention is not particularly limited. Accordingly, it is possible to apply to a block having any shapes such as a V shape, a polygonal shape, a curve keynote or the like, in place of the block having the rectangular shape in the plan view. Further, it is possible to employ a rib extending in a linear shape or a zigzag shape along a tire circumferential direction in place of the block or in addition thereto. Further, in the present invention, the sipe structure as mentioned above can be employed with respect to all the land portions within the tread pattern, however, may be employed only with respect to a partial land portion within the tread pattern.

Figure 6:
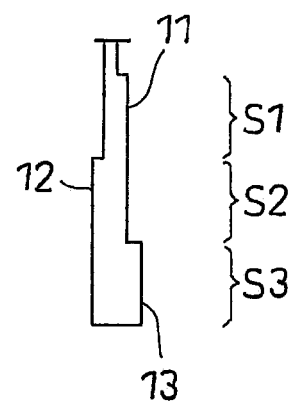
FIG. 6 is a side elevational view of a main portion showing a sipe structure in which a first wide portion and a second wide portion do not have any bottom portion.

(2) In the embodiment mentioned above, there is shown the example in which the first wide portion and the second wide portion have the bottom portions, however, the present invention is not limited to this. FIG. 6 shows an example of a sipe structure in which the first wide portion 11 and the second wide portion 12 do not have any bottom portion. In the structure mentioned above, the second sipe portion S2 is wider than the first sipe portion S1, and the third sipe portion S3 is wider than the second sipe portion S2, whereby it is possible to achieve the operations and effects mentioned above.

(3) In the embodiment mentioned above, there is shown the example in which three kinds of wide portions are provided in the sipe, however, four or more kinds of wide portions may be provided. In this case, it is preferable that the wide portions are alternately provided while sandwiching the sipe reference surface therebetween along the depth direction such as the embodiment mentioned above.

(4) In the embodiment mentioned above, there is shown the example in which the longitudinal direction of the sipe is in parallel to the tire width direction, however, the present invention is not limited to this, but the sipe longitudinal direction may be inclined with respect to the tire width direction. Further, in the embodiment mentioned above, there is shown the example in which each of the wide portions extends straight in the longitudinal direction, however, the present invention is not limited to this, but the wide portion may have an amplitude in the depth direction so as to extend as a waveform or a zigzag shape.

EXAMPLE

A description will be given below of an evaluation of an ice braking performance for specifically indicating the structure and the effect of the present invention. The ice braking performance is evaluated by installing the tire to an actual car (3000 cc class FR sedan) and measuring a braking distance at a time of traveling on an ice road surface and applying a braking force from a speed 40 km/h so as to actuate an ABS, and is evaluated in four stages including a state in which tires are new, worn 25%, worn 45% and worn 75%. A result of the comparative example at the state in which tires are new is indicated by an index 100, and the greater numerical value indicates the better ice braking performance.

In the tire having the tread pattern as shown in FIG. 1, the tire having the fixed sipe width of 0.3 mm is set to the comparative example, and the tire having the sipe provided with the first to third sipe portions as shown in FIGS. 2 and 3 is set to the example. In the example, W=0.3 mm, W1=0.5 mm, W2=0.7 mm and W3=0.9 mm are set, and d:D1:D2:D3=1:2:2:2 is set. The sizes of the both are set to 205/65R15, and the sipe depth D is set to 8 mm. Results of the evaluation are shown in Table 1.

TABLE 1

| Ice braking performance | Comparative example | Example |
|---|---|---|
| New tire | 100 | 107 |
| Worn 25% | 97 | 106 |
| Worn 45% | 95 | 105 |
| Worn 75% | 90 | 101 |

As shown in Table 1, in the comparative example, the ice braking performance is lowered in accordance with the progress of the wear. It is thought that since the height of the block is reduced by the wear and the rigidity is improved, the collapse of the block becomes small and the edge effect is lowered. on the contrary, in the example, the good ice braking performance can be achieved regardless of the stages of progress of the wear. It is thought that the example can secure the collapse of the block so as to suitably achieve the edge effect by making the block rigidity proper in correspondence to the stages of progress of the wear, and it is further possible to inhibit the opening portion of the sipe from being narrowed so as to secure the edge effect and the drainage effect.

What is claimed is:

1. A pneumatic tire structured such that a sipe is formed in a land portion of a tread surface,
   wherein the sipe comprises:
   a first sipe portion provided with a first wide portion, wherein the first wide portion extends in a depth direction from a depth position which is spaced from the tread surface;
   a second sipe portion provided with a second wide portion in only a different side from the first wide portion in a sipe width direction, and positioned in a sipe bottom portion side of the first sipe portion so as to be wider than the first sipe portion; and
   a third sipe portion provided with a third wide portion in only the same side as the first wide portion in the sipe width direction, and positioned in a sipe bottom portion side of the second sipe portion so as to be wider than the second sipe portion,
   wherein the first wide portion has a bottom portion, and the second wide portion extends in a depth direction from the same depth position as the bottom portion of the first wide portion or a depth position closer to the tread surface than the bottom portion of the first wide portion,
   wherein the second wide portion has a bottom portion, and the third wide portion extends in a depth direction from the same depth position as the bottom portion of the second wide portion or a depth position closer to the tread surface than the bottom portion of the second wide portion.

2. The pneumatic tire according to claim 1, wherein the land portion is provided with a cap rubber layer exposed to the tread surface, and a base rubber layer arranged in an inner peripheral side of the cap rubber layer and having a higher rubber hardness than the cap rubber layer.

3. The pneumatic tire according to claim 1, wherein the sipe width at the tread surface is between 0.2 and 0.6 mm, the sipe width of the first sipe portion is wider than the sipe width at the tread surface by 0.1 mm or more, with first sipe inner wall surfaces extending in the sipe depth direction while the sipe width of the first sipe portion is maintained, the sipe width of the second sipe portion is wider than the sipe width of the first sipe portion by 0.1 mm or more, with second sipe inner wall surfaces extending in the sipe depth direction while the sipe width of the second sipe portion is maintained, and the sipe width of the third sipe portion is wider than the sipe width of the second sipe portion by 0.1 mm or more, with third sipe inner wall surfaces extending in the sipe depth direction while the sipe width of the third sipe portion is maintained.

4. The pneumatic tire according to claim 1, wherein the sipe has a depth that is 30% to 80% of the depth of a main groove of the tire.

5. The pneumatic tire according to claim 1, wherein the third sipe portion extends in a depth direction to the bottom of the sipe.

* * * * *